United States Patent Office 3,275,531
Patented Sept. 27, 1966

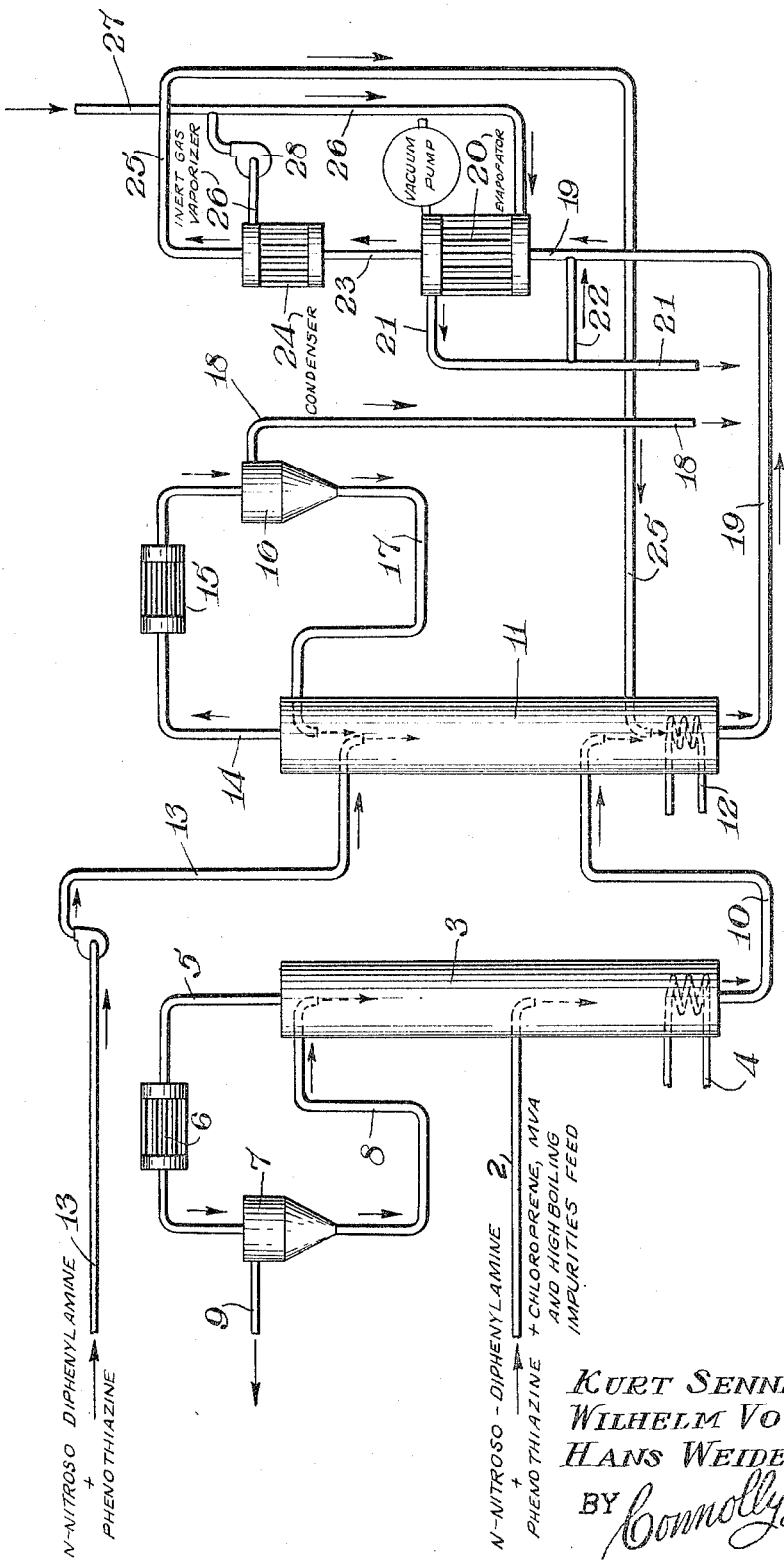

3,275,531
PURIFICATION OF CHLOROPRENE BY PLURAL STAGE DISTILLATION AND THE ADDITION OF POLYMERIZATION INHIBITORS
Kurt Sennewald and Wilhelm Vogt, Knapsack, near Cologne, and Hans Weiden, Rodenkirchen, near Cologne, Germany, assignors to Knapsack-Griesheim Aktiengesellschaft, Knapsack, near Cologne, Germany, a corporation of Germany
Filed Sept. 25, 1963, Ser. No. 311,553
Claims priority, application Germany, July 28, 1960, K 41,309
4 Claims. (Cl. 203—8)

The present invention is concerned with a process of isolating and purifying chloroprene and with apparatus for carrying out the said process, and is a continuation-in-part application of application Serial No. 125,150 filed by Kurt Sennewald et al. on July 19, 1961 (now abandoned).

U.S. Patent No. 2,984,690 is concerned with a process for manufacturing pure chloroprene, which comprises reacting monovinylacetylene with hydrogen chloride in an initial reaction zone to obtain a starting gas mixture comprising chloroprene and monovinylacetylene, wherein the chloroprene forms about 2 to 25% by volume of the mixture and wherein there are present in the mixture about 0.1 to 5% by volume of higher boiling impurities resulting from the reaction, said impurities comprising at least one substance selected from the group consisting of dichlorobutene, chloroprene oils and methylvinylketone, washing said gaseous mixture with water to de-acidify the mixture, separating in a first distillation stage the monovinylacetylene portion contained in the starting gas mixture which results from the reaction from the chloroprene and the higher boiling impurities, said chloroprene and said impurities being obtained as sump saturated with dissolved monovinylacetylene, separating the chloroprene from the higher boiling impurities in the second distillation stage by means of a gas current consisting of monovinylacetylene, expelling in a third distillation stage by means of a current of an oxygen-free inert gas the monovinylacetylene which is still dissolved in the chloroprene taken off from the second distillation stage, and maintaining a pressure of up to about 5 atmospheres during the distillation steps.

According to column 5, lines 40 to 66 of that patent the numerous cycling currents of the individual gas portions are characteristics of the process. The unreacted monovinylacetylene flowing off the reactor is first taken off at the head of the first distillation stage and then reconducted in a cycle into the reactor. Dissolved in chloroprene, the monovinylacetylene only partially reaches the third distillation stage and from there, subsequent to its expulsion, the washing tower, from which it is reconducted in a cycle and, for example, again dissolved in chloroprene, into the second distillation stage. The second cycle comprising the second distillation stage consists of a nearly constant amount of monovinylacetylene used as additional expulsion gas for separating the chloroprene from the higher boiling impurities, whereas at the head of the first stage only unreacted starting monovinylacetylene is drawn off. The third cycle finally consists of an inert gas such as nitrogen, which is used for expelling the residual monovinylacetylene from the chloroprene in the third and generally last distillation stage. Said inert gas is conducted in a cycle via the third distillation stage and the adjacent washing tower.

In order to strictly exclude oxygen during the distillation, the process according to U.S. Patent No. 2,984,690 is carried out with the use of monovinylacetylene and nitrogen as the expelling gas, and optionally n-butane as the diluting gas under slightly elevated pressure, the monovinylacetylene and nitrogen being conducted in a separate cycle. Only phenothiazine is added as an α-polymerization inhibitor.

The conventional process is intended to prevent chloroprene during its preparation and isolation from undergoing ω-polymerization by reducing its partial pressure and its boiling temperature and from undergoing α-polymerization by adding phenothiazine thereto. Diluting chloroprene in the gaseous phase with an inert gas, such as monovinylacetylene, n-butane or nitrogen, and in the liquid phase with monovinylacetylene, the dilution being intended to reduce the partial pressure of the chloroprene, is associated with great expense of apparatus and energy and is a rather complicated procedure. Notwithstanding that the total pressure in the individual columns was previously in most cases slightly above atmospheric pressure, the partial pressure of the chloroprene in the gas mixture was so low that the distillation of the chloroprene can practically be termed to have been carried out in vacuo.

This uneconomic but previously necessary dilution of liquid and gaseous chloroprene with amounts of inert gas substantially greater than the amount of chloroprene itself and with the use of costly cooling brine having a temperature of −40° C. to maintain low temperatures is illustrated with reference to U.S. Patent No. 2,984,690.

Column 6, lines 66 to 70: 16 kg./hr. chloroprene are diluted with 147 kg./hr. monovinylacetylene.

Column 7, lines 13 to 15: The temperature in the still of the first distilling column (7) amounts to +25° C., the head temperature to +5° C.

Lines 33 to 49: The partial pressure and the temperature of the chloroprene in the second distilling stage are reduced by introducing monovinylacetylene under a pressure of 0.25 atmosphere (gauge pressure).

Lines 65 to 75: A liquid mixture of 30 kg./hr. chloroprene and 10 kg./hr. monovinylacetylene is cooled in cooler (20) to −20° C. and supplied to the third distilling column (21) at a still temperature of +14° C and a head temperature of −15° C., into which nitrogen is introduced under a pressure of 0.15 atmosphere (gauge pressure).

Column 8, lines 1 to 20: The nitrogen charged with 10 kg./hr. monovinylacetylene and 3 kg./hr. chloroprene is washed in wash column (25) at a still temperature of −18° C. by means of a current of chloroprene having a temperature of −30° C.

The higher the temperature the more inert gas is required in the old processes for diluting the chloroprene.

The present invention unexpectedly provides a process for purifying and isolating chloroprene, wherein at least the first two processing stages are carried out at atmospheric pressure and wherein more particularly the separate monovinylacetylene cycle required in the conventional processes for expelling chloroprene from higher boiling chloroprene oils in the second distillation stage is omitted.

In the stills of the first and second distillation stages chloroprene partial pressures between about 760 and 850 mm. Hg will therefore appear, that is to say the temperatures vary between $+60°$ to $+70°$ C.

While in the customary methods, it has been necessary to carry monovinylacetylene along into the wash tower of the third stage, all monovinylacetylene is withdrawn in the process of the present invention as early as at the head of the first processing stage.

Whereas in the conventional methods, a mixture of about 3 parts by weight chloroprene with 1 part by weight monovinylacetylene has been conveyed from the second distillation stage to the third distillation stage for further separation, pure chloroprene is already obtained in the process of the present invention at the top portion of the second distilling stage. Already after two stages, the purification of the chloroprene is basically complete. Merely the sump product containing a further portion of chloroprene is processed in a third stage, wherein, as taught by the present invention, rather pure chloroprene is separated from the sump product, for example by distillation in vacuo, and returned to the second distilling stage for fine purification. The vacuum distillation used in the third stage may optionally be replaced with a small non-reactive gas cycle separating rather pure chloroprene as the head product from the high boiling sump in the still. This rather pure chloroprene is separated from the non-reactive gas, preferably nitrogen, by condensation and returned into the second stage for fine purification.

In contrast therewith, the method described in U.S. Patent 2,984,690 uses a much more complicated procedure in the third stage: the chloroprene/monovinylacetylene mixture (3:1) coming from the second processing stage is conveyed into a third stage and separated therein with a non-reactive gas cycle into pure chloroprene as the still product and into monovinylacetylene/non-reactive gas as the head product; the mixture of monovinylacetylene with non-reactive gas is then required to be washed with pure chloroprene in a wash tower, whereby non-reactive gas is set free for new use, whereas the chloroprene/monovinylacetylene mixture (about 14:10) is again introduced into the second stage for separation.

In other words, the non-reactive gas cycles used in the third stages, respectively, of the conventional and the present separating processes have nothing in common but the processing agent (for example nitrogen), but they differ basically in their respective function and importance for the purifying process as stated above.

The advance achieved in the art by the process of the present invention is unexpected. The apparatus is considerably smaller, of more simple design and more economic, and substantially less energetic expense is required for purifying chloroprene.

The α-polymerization is avoided by the conventional use of, for example, phenothiazine as a stabilizer. It is, however, advantageous to use concurrently therewith an agent inhibiting ω-polymerization, for example the well-known N-nitroso-diphenylamine, in that particular case where, on carrying out the distillation at atmospheric pressure, or under reduced pressure in the third stage, minor amounts of oxygen penetrate into the apparatus, which would promote the ω-polymerization of the chloroprene.

Referring to the polymerization of chloroprene:

Chloroprene readily forms two types of polymers even at temperatures below 0° C. and above about $+60°$ C., corresponding to a vapor pressure ranging from an industrially realizable vacuum to above atmospheric pressure. One type of polymer is the α-polymer which dissolves wholly or partially in the monomer. The other type is the crumbly, cauliflower-like ω-polymer, also named "popcorn polymer." Both types of polymers complicate the distillative purification of chloroprene by clogging the distilling unit.

Either type of polymer is formed by a specific reaction mechanism and their structures differ substantially from one another. Consequently, the formation of either type of polymer is inhibited by different stabilizers. The α-polymerization is easily prevented by numerous inhibitors, such as redox systems of the hydroquinone, pyrocatechol or phenothiazine type, while nitric oxide and nitrogen dioxide are substantially the only agents inhibiting the ω-polymerization. Nitrogen dioxide, however, reacts with chloroprene to form oily, explosive compounds. The danger of explosion especially exists when NO and $NO_2$ react with monovinyl acetylene which is contained in the crude chloroprene as primary product. Stabilizers of this kind can thus only be used with special precautions.

U.S. Patent 3,015,677 describes the use of N-nitroso-diphenylamine as polymerization inhibiting stabilizer. Further experiments have revealed that the ω-polymerization of chloroprene can be prevented with certainty at a temperature of about 45–85° C. when about 0.2 to 10 parts by weight of N-nitroso-diphenylamine are added to 1000 parts by weight of pure chloroprene. The stabilizer concentration for safely inhibiting the growth of ω-polymer depends on the temperature and is the lower the higher the temperature. At the boiling temperature of chloroprene, about 0.3 to 0.7 part by weight of N-nitroso-diphenylamine are used for 1000 parts by weight of monomer.

N-nitroso-diphenylamine stabilizes pure chloroprene in the same manner as it stablizes crude chloroprene containing dissolved monovinyl acetylene, methylvinyl ketone, 1,3-dichlorobutene and dimers. In this case, the ω-polymerization of the chloroprene can be safely prevented in the gaseous and liquid phase at a temperature in the range from about 25 to 85° C. when 0.1 to 10 parts by weight of N-nitroso-diphenylamine are added per 1000 parts by weight of crude chloroprene. In this case, too, the amount of inhibitor required for stabilizing the chloroprene depends on the temperature and can be the lower the higher the temperature. At a temperature. At a temperature of about 60° C., it is sufficient for example, to add 0.2 part by weight of N-nitroso-diphenylamine to 1000 parts by weight of crude chloroprene.

It is of advantage to use the N-nitroso-diphenylamine in combination with a stabilizer inhibiting the α-polymerization, such as hydroquinone, pyrocatechol, phenothiazine or derivatives thereof.

Whereas in the distillation of chloroprene at atmospheric pressure in the absence of N-nitroso-diphenylamine the aforementioned disturbances may occur, the operating method with the use of N-nitroso-diphenylamine can be performed without disturbances by ω-polymerization occuring. The economic advantage of the distillation at atmospheric pressure in accordance with the present invention resides in the especially low expenditure pertaining to apparatus as compared with the usual purification of chloroprene under reduced pressure or the known distillative purification with gas-charged columns.

More particularly, the process for isolating and purifying chloroprene in accordance with the present invention comprises conducting the crude chloroprene obtained in the known reaction of monovinylacetylene with hydrogen chloride, deacidified by a water wash and dried, if desired, which chloroprene contains monovinylacetylene and higher impurities such as dichlorobutene, dimeric chloroprene and methylvinyl ketone, to a first distillation stage, discharging the monovinylacetylene at the head of said stage, conducting the first stage's sump product consisting of chloroprene and higher impurities to a second distillation stage, discharging from said distillation stage pure chloroprene at the head, conducting the second stage's sump product consisting of the higher impurities and residual chloroprene to a third evaporation stage, wherein merely the residual and rather pure chloroprene is expelled and reconducted to the second stage, at least the first and the second stages being carried out at pressures between about 650 and 850 mm. Hg and all stages with the addition of a substance inhibiting the α-polymerization and being selected from the group consisting of hydroquinone, pyrocatechol and phenothiazine, and in the presence of N-nitroso-diphenylamine inhibiting the ω-polymerization. The third evaporation stage may also be carried out under reduced pressure, i.e. in vacuo below about 650 mm. Hg. The crude chloroprene used in this process may contain up to 40% by weight of monovinylacetylene and up to 15% by weight of higher boiling impurities. The third evaporation stage is preferably provided with an inert gas cycle, for example nitrogen, for blowing off the chloroprene which is then separated from the nitrogen current by condensation.

N-nitroso-diphenylamine for preventing the ω-polymerization is preferably added in an amount of about 0.1 to 10 parts by weight for 1000 parts by weight of crude chloroprene for a stabilization at a tempereature in the range from about 25 to 85° C. and in an amount of about 0.2 to 10 parts by weight for 1000 parts by weight of pure chloroprene for a stabilization at a temperature in the range from about 45 to 85° C. At the boiling temperature of chloroprene, about 0.3 to 0.7 part by weight of N-nitroso-diphenylamine is used per 1000 parts by weight of chloroprene.

The process of the invention is illustrated by the following example and with reference to the flow diagram shown in the accompanying drawing.

*Example*

A distillation unit made of stainless steel and designed for purifying 20 tons per month of chloroprene was operated for 3600 hours without disturbing ω-polymerization taking place at any point of the unit. The unit was esssentially composed of two distilling columns 3 and 11. In the first distilling column 3, which was filled with saddle-shaped bodies, monovinylacetylene was expelled at a head temperature of 5° C. 765 mm. Hg) and a still temperature of 61° C. 780 mm. Hg) produced by heater 4, from the crude chloroprene consisting of about 68% by weight chloroprene, about 25% by weight monovinylacetylene, 1% by weight methylvinyl ketone, 4% by weight dichlorobutene and 2% by weight dimer. The crude chloroprene flowing into column 3 approximately in the center by way of conduit 2 was stabilized with 0.2 to 0.5 part per thousand by weight N-nistroso-diphenylamine and 0.2 part per thousand by weight phenothiazine. The monovinylacetylene drawn off at the head of column 3 was returned via conduit 5, cooler 6, receiver 7 and conduit 9 into the reaction vessel for being reacted again catalytically to yield chloroprene, while the reflux passed from the receiver 7 over conduit 8 again into column 3 at the head. The sump product of the first column 3, which consisted of about 91% by weight chloroprene, 5.5% by weight dichlorobutene, 1.0% by weight methylvinyl ketone and 2.5% by weight dimer, travelled, via bottom outlet 10, into the lower third of the second distilling column 11, which was also filled with saddle-shaped bodies. At a temperature of 60° C. (765 mm. Hg) pure chloroprene was discharged as head product by way of conduit 14, condenser 15, separator 16 and overflow conduit 18, while the reflux returned via conduit 17 to the head of column 11. The high-boiling impurities contained in the crude chloroprene remained in the sump product of column 11. The still of column 11 was maintained at 65–70° C. (850 mm. Hg) by heater 12. At the head of column 11, a solution of N-nitroso-diphenylamine and phenothiazine in pure chloroprene (composition about 15% by weight N-nitroso-diphenylamine, 1% by weight phenothiazine and 84% by weight chloroprene) was pumped in by way of conduit 13 in an amount such that the reflux liquid contained 0.3 to 0.5 part per thousand by weight N-nitroso-diphenylamine and 0.2 part per thousand by weight of phenothiazine. The sump product of column 11 was discharged at 65–70° C. via bottom outlet 19. It contained 7.5 to 9% by weight dimer, 18–35% by weight dichlorobutene, 3 to 8.5% by weight methylvinyl ketone and 40–70% by weight chloroprene. A further distillation of the sump product was not advantageous since, in this case, decompositions did occur. The sump product was, therefore, conducted into an evaporator 20 which was separated from column 11 and in which the chloroprene still contained in the sump product of column 11 was distilled off under reduced pressure down to a residual content of about 5 to 15% by weight. The condensate of rather pure chloroprene was reconducted directly above the still into the second distilling column 11 via conduit 25.

This mode of operation was varied, for example, in a manner such that the evaporator 20 was not operated under reduced pressure but an inert gas, for example nitrogen, was supplied by way of conduit 27 and introduced into evaporator 20 via conduit 26 for reducing the partial pressure and the boiling temperature and for expelling the chloroprene. The chloroprene was carried off in vapor form with said inert gas by way of conduit 23 and condensed in condenser 24 connected in series. The inert gas current leaving the condenser 24 was recycled to the sump of the evaporator 20 by means of a gas pump 28 inserted into conduit 26. The amount of stabilizer introduced into distilling columns 3 and 11 and still contained in the sump product of the second column 11 was sufficient for stabilizing the system of the evaporator. In this mode of operation, the temperature of the evaporator was maintained at 60–65° C. and the condenser 24 was charged with a brine of −20° C.

The condensate of rather pure chloroprene was reconducted via conduit 25 into the sump of the second distilling column 11, while the higher impurities composed of about 5–15% by weight residual chloroprene, 50–56% by weight dichlorobutene, 10–11% by weight methylvinyl ketone and 25–28% by weight dimer, were discharged via conduit 21 and branch conduit 22.

We claim:

1. In the process for isolating and purifying crude chloroprene obtained by reacting monovinylacetylene with hydrogen chloride, deacidified by a water wash and containing monovinylacetylene and higher impurities such as dichlorobutene, dimeric chloroprene and methylvinyl ketone, which comprises separating in distillation stages chloroprene from said impurities and said monovinylacetylene, all separating stages being carried out in the presence of substances prohibiting polymerization, the improvement which consists essentially of withdrawing all monovinylacetylene at a temperature of 5° C. and 765 mm. Hg at the head of a first distilling stage, conducting the first stage's sump product consisting of chloroprene and higher boiling point impurities to a second distillation stage, distilling off pure chloroprene at a temperature of 60° C. and 765 mm. Hg at the head of said second stage, the temperatures and chloroprene partial pressures in the stills of the first and second distillation stages being between about 60–70° C. and between about 760 and 850 mm. Hg, respectively, conducting the second stage's sump product consisting of the higher boiling point impurities and residual chloroprene to a third distillation stage wherein the residual chloroprene is distilled off under reduced pressure below about 650 mm. Hg and reconducted into said second stage, all stages being carried out in the presence of a substance inhibiting the α-polymerization and being selected from the group consisting of hydroquinone, pyrocatechol and phenothiazine, and in the presence of N-nitrosodiphenylamine inhibiting the ω-polymerization.

2. A process as claimed in claim 1, wherein N-nitroso-diphenylamine is used in an amount of about 0.1 to 10 parts by weight for 1000 parts by weight of crude chloroprene for stabilization at a temperature in the range from about 25° C. to 85° C.

3. A process as claimed in claim 1, wherein N-nitroso-diphenylamine is used in an amount of about 0.2 to 10 parts by weight for 1000 parts by weight of pure chloroprene for stabilization at a temperature in the range from 45° C. to 85° C.

4. A process as claimed in claim 3, wherein about 0.3 to 0.7 part by weight of N-nitroso-diphenylamine is used for 1000 parts by weight of chloroprene at the boiling temperature of chloroprene.

References Cited by the Examiner
UNITED STATES PATENTS

| 2,984,690 | 5/1961 | Sennewald et al. | 260—655 |
| 3,015,677 | 1/1962 | Vogt et al. | 260—652.5 |

NORMAN YUDKOFF, *Primary Examiner.*

WILBUR L. BASCOMB, Jr., *Examiner.*

J. GAZEWOOD, M. H. SILVERSTEIN,
*Assistant Examiners.*